(12) United States Patent
Hutz

(10) Patent No.: US 10,281,166 B1
(45) Date of Patent: May 7, 2019

(54) DISTRIBUTED MONITORING SENSOR NETWORKS

(71) Applicant: Alarm.com Incorporated, Tysons, VA (US)

(72) Inventor: David James Hutz, Herndon, VA (US)

(73) Assignee: Alarm.com Incorporated, Tysons, VA (US)

( * ) Notice: Subject to any disclaimer, the term of this patent is extended or adjusted under 35 U.S.C. 154(b) by 279 days.

(21) Appl. No.: 15/180,739

(22) Filed: Jun. 13, 2016

Related U.S. Application Data

(60) Provisional application No. 62/174,734, filed on Jun. 12, 2015.

(51) Int. Cl.
| | |
|---|---|
| *G06F 15/16* | (2006.01) |
| *F24F 11/30* | (2018.01) |
| *H04L 29/08* | (2006.01) |
| *H04W 48/10* | (2009.01) |
| *H04W 8/00* | (2009.01) |
| *H04L 29/06* | (2006.01) |
| *F24F 110/00* | (2018.01) |
| *H04W 88/04* | (2009.01) |
| *F24F 110/40* | (2018.01) |

(52) U.S. Cl.
CPC .......... *F24F 11/30* (2018.01); *H04L 63/0428* (2013.01); *H04L 67/125* (2013.01); *H04W 8/005* (2013.01); *H04W 48/10* (2013.01); *F24F 2110/00* (2018.01); *F24F 2110/40* (2018.01); *H04W 88/04* (2013.01)

(58) Field of Classification Search
CPC .... F24F 11/30; F24F 2110/00; F24F 2110/40; H04L 63/0428; H04L 67/125; H04W 8/005; H04W 48/10; H04W 88/04
USPC .......................................................... 709/227
See application file for complete search history.

(56) References Cited

U.S. PATENT DOCUMENTS

| | | | |
|---|---|---|---|
| 7,113,090 B1 * | 9/2006 | Saylor | G08B 13/19682 340/5.33 |
| 9,064,394 B1 * | 6/2015 | Trundle | G08B 13/19684 |
| 2008/0004904 A1 * | 1/2008 | Tran | A61B 5/0006 705/2 |
| 2015/0304171 A1 * | 10/2015 | Kim | H04L 67/125 715/733 |

\* cited by examiner

*Primary Examiner* — S M A Rahman
(74) *Attorney, Agent, or Firm* — Fish & Richardson P.C.

(57) ABSTRACT

Methods and systems for monitoring multiple sensors over a distributed sensor network to enhance various monitoring operations. In some implementations, an identification of a sensor located in a property and a token that enables the mobile device to obtain data from the sensor are each received by a mobile device from a server. The mobile device is then determined to be within a communication range with the server that is indicated by the identification from the server. In response, data is obtained from the sensor by the mobile device using the token received from the server.

19 Claims, 12 Drawing Sheets

DISTRIBUTED MONITORING SENSOR NETWORKS

CROSS-REFERENCE TO RELATED APPLICATION

This application claims priority from U.S. Provisional Application No. 62/174,734, filed Jun. 12, 2015, and titled "DISTRIBUTED MONITORING SENSOR NETWORKS," which is hereby incorporated by reference in its entirety.

TECHNICAL FIELD

This disclosure relates to sensing technology and, for example, distributed sensor networks.

BACKGROUND

Sensors may be used in properties to detect specific characteristics related to heating, ventilating, and air conditioning (HVAC) performance, occupancy, or device connectivity. For example, pressure sensors may be used to determine changes in air pressure from heating and cooling events. Motion sensors may also be used to determine occupancy by detecting movement of people or objects within the house. Electrical and other sensors may be used to exchange communications between electronic devices over a shared network.

SUMMARY

In some implementations, multiple sensors are monitored over a distributed sensor network to enhance various monitoring operations. For example, the monitoring operations may include determining when HVAC air filters need to be replaced, balancing HVAC operation based on detecting air pressure within air ducts, combining pressure, temperature, and occupancy data to identify HVAC problems, determining and broadcasting statuses of connected appliances to perform intelligent maintenance operations, or monitoring occupancy data within the property to adjust appliance operations to user behavior using cloud-based and time-limited connection platforms.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings.

DETAILED DESCRIPTION

Techniques are described for performing monitoring operations using a distributed network of sensors. In some implementations, pressure sensors may monitor air pressure across a furnace filter. For example, measured air pressure levels across the furnace filter may be compared to expected pressure levels. The furnace filter may be determined to need replacement based on determining that the measured pressure exceeds the expected pressure levels. In response, a notification indicating that the furnace requires replacement may be transmitted to a mobile device.

In some implementations, pressure sensors may be used with air vent statuses to balance the operations of a HVAC unit. For example, pressure inside air ducts, return vents, and rooms within a property may be measured and combined with statuses of vents connected to the air ducts that indicate whether the vents are open or closed. The measured pressures at the return vent may be compared to the measured pressures in the rooms within the property and the statuses of the air vents. In response, HVAC operations may be performed based on comparing the pressures and statuses of the air vents.

In some implementations, temperature and pressure sensors placed on a HVAC evaporator may be used to identify HVAC problems. For example, temperature and pressure may be measured near the evaporator. Increases in temperature or pressure may be determined based on the measured temperature and pressure. In response to the increased temperature or pressure, problems with the fan or the compressor may be identified. A particular operation may be performed based on the identified problem with the fan or the compressor.

In some implementations, proximity, motion, and weight sensors may be used to monitor movement and usage data of specified locations within a property. For example, sensors may be used to detect movement of a person or usage of specific objects (e.g., pet water dish, bed or couch, propane, water or oil tank) used to perform operations.

Figure 1:
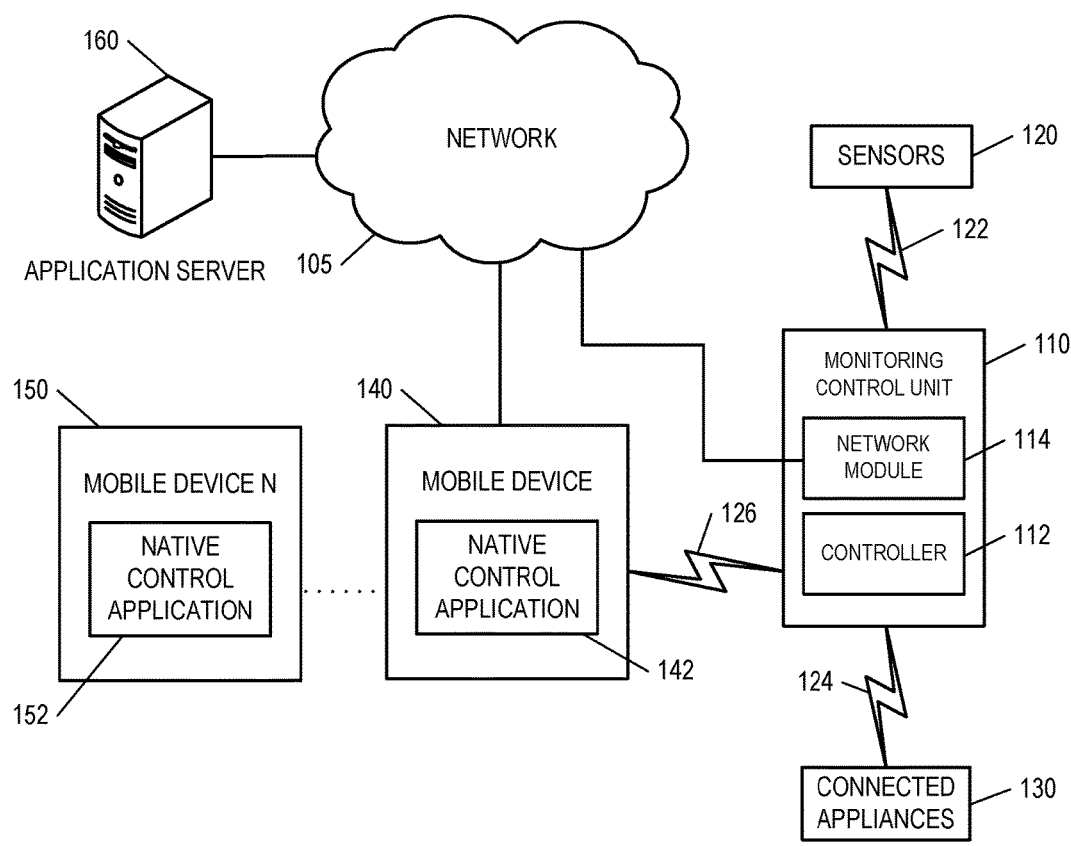
FIG. 1 illustrates an example of a system.

FIG. 1 illustrates an example of a system 100 that may be configured to monitor various operations using a distributed sensor network. The system 100 may include a network 105, a monitoring control unit 110, sensors 120, connected appliances 130, one or more mobile devices 140, 150, and an application server 160. The network 105 may be configured to enable electronic communications between devices connected to the network 105. For example, the network 105 may be configured to enable exchange of electronic communications between the monitoring control unit 110, the one or more mobile devices 140, 150, and the application server 160.

The network 105 may include, for example, one or more of the Internet, Wide Area Networks (WANs), Local Area Networks (LANs), e.g., Wi-Fi, analog or digital wired and wireless telephone networks, e.g., a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. The network 105 may include multiple networks or subnetworks, each of which may include, for example, a wired or wireless data pathway. The network 105 may also include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may also be a wireless network, a broadband network, or a combination of networks including a wireless network and a broadband network.

The monitoring control unit 110 may include a controller 112 and a network module 114. The controller 112 may be configured to control a system, e.g., a HVAC unit associated with a property that includes the monitoring control unit 110. In some examples, the controller 112 may include a processor or other control circuitry configured to execute instructions of a program that controls operation of a HVAC unit. In these examples, the controller 112 may be configured to receive input from sensors, detectors, or other devices associated with the HVAC unit and control operation of components of the HVAC unit, e.g., a temperature sensor, a furnace, a evaporator coil, a heat exchanger, a condensing unit, or other devices associated with the property, e.g., an appliance, lights, etc. For example, the controller 112 may be configured to control operation of the network module 114 included in the monitoring control unit 110.

The network module 114 may be a communication device configured to exchange communications over the network 105. The network module 114 may be a wireless communication module configured to exchange wireless communications over the network 105. For example, the network module 114 may be a wireless communication device configured to exchange communications over a wireless data channel. In this example, the network module 114 may transmit user location data within or external to the property, environmental data from the property, e.g., indoors at the property or outdoors at the property, or other data over a wireless data channel. The wireless communication device may include one or more GSM modules, a radio modem, a cellular transmission module, or any type of module configured to exchange communications in one of the following formats: LTE, GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring control unit 110 to communicate over a local area network and/or the Internet. The network module 114 also may be a voiceband modem configured to enable the alarm panel to communicate over the telephone lines of Plain Old Telephone Systems (POTS). In some implementations, the alarm panel may be a broadband or cellular gateway where the network module 114 may enable the monitoring control unit 110 to communicate over the network 105.

The system 100 that may include the monitoring control unit 110 may communicate with the sensors 120, and the connected appliances 130 to monitor various operations related to functions of the connected appliances 130. The sensors 120 may include pressure sensors, temperature sensors, motion sensors, occupancy sensors, or scales or other sensors configured to a distributed sensor network over the network 105. Each of the sensors 120 may collect and transmit information to the monitoring control unit 110, which may analyze aggregate data to control monitoring operations of the system 100.

In some implementations, the sensors 120 may include HVAC furnace filter sensors that measure pressure across the furnace filters to indirectly measure how dirty the filter is and when the filter needs to be replaced. For example, in some instances, the pressure sensor may be embedded directly into the furnace filter to measure air flow, where lower air flows may indicate the filter is dirtier. In some instances, the pressure sensor may be embedded in the air duct after air passes through the filter to determine how the filter impacts air flow through the air duct, where a greater impact indicates the filter is dirtier. In some instances, two independent pressure sensors may be placed in the air ducts before and after the air filter to determine how the air flow is impacted before and after the air flow passes through the filter, where a greater differential in air flow indicates the filter is dirtier. In this instance, the independent pressure sensors may initially be calibrated periodically (e.g., daily) when the fan is turned off and the pressure differential across the filter should be equal to zero.

In some implementations, the sensors 120 may include temperature and pressure sensors near a HVAC evaporator to detect problems with HVAC compressor and fans by measuring changes in measured temperature or changes in pressure. For example, the monitoring control unit 110 may detect increases in temperature that may indicate problems with a compressor and decreases in pressure that may indicate problems with fans. In some instances, the sensors may compare the measured temperature and pressure values to a threshold value based on the settings of the monitoring control unit 110. For example, the monitoring control unit 110 may compare the measured temperature to a threshold temperature value and if the measured temperature is below the threshold temperature value, determine there is a problem with the compressor. In another example, the monitoring control unit 110 may compare the measured pressure to a threshold pressure value and if the measured pressure is below the threshold pressure value, determine there is a problem with the fan.

The sensors may also monitor and analyze long-term data collected within the property to determine trends in temperature or pressure that may indicate either gradual degradations in performance, which may indicate normal component deterioration, or drastic decreases in performance, which may indicate component failures. For example, the monitoring control unit 110 may detect an upward trend in temperature and in response determine there may be a problem with the compressor. In another example, the monitoring control unit 110 may detect a downward trend in pressure and in response determine there may be a problem with a fan. In some instances, the temperature and pressure sensors may exchange data transmissions to perform correlations between temperature and pressure for a certain HVAC operation. For instance, if the temperature sensor indicates that the temperature is increasing during a heating event but the pressure sensor indicates that there is no increase in air flow, the sensors may send a notification to the monitoring control unit 110 with details of this discrepancy. In some implementations, the monitoring control unit 110 may receive the sensor data from the temperature sensor and pressure sensor and detect the above discrepancy.

In some implementations, the sensors 120 may include motion sensors, pressure sensors, or other sensors that determine occupancy and usage of appliances/features within the property. For example, in some instances, motion and temperature sensors may be placed on the walls within a room to determine if a person is currently occupying or not occupying the room. In response, the system 100 may automatically adjust the heating or cooling operations to emphasize rooms that are occupied and reduce resources toward rooms that are unoccupied. In such an instance, the motion sensor may be used to determine occupancy while the temperature sensors may be used to adjust the air flow through the return vents within a room. For example, the system 100 may reduce air flow to unoccupied rooms, e.g., closing air vents or reducing fan speed, or increase air flow to occupied rooms, e.g., opening air vents or increasing fan speed. In some instances, a network of sensors may be placed on windows or doors of a room to determine how the configuration of the doors and windows may impact airflow within the room. In this instance, the network of sensors may be used to adjust airflow during heating and cooling operations more efficiently to reduce non-uniform distributions of airflow due to open windows and open doors. Additionally or alternatively, the configuration of the windows or doors may be adjusted based on the airflow within the room. For example, the system 100 may open windows or doors in response to detecting an increase in airflow to a room.

In some instances, sensors may be placed on particular objects and/or appliances to monitor activity related to the object. For example, a water level sensor may be place on a dog dish to determine when the dish may need to be refilled. In another example, a pressure sensitive scale may be placed underneath a potted plant to measure the weight-loss curve. In this example, the plant may be automatically watered when the sensor measures low weights. In another example, motion sensors or weight sensors may be placed on mattresses to determine the amount of movement a user may experience during sleep and when the mattress is occupied. In another example, liquid level sensors may be placed in propane, water and oil tanks or weight sensors may be placed below the tanks to determine when the levels are low. In all of the examples described above, the system 100 may perform a monitoring operation based on the set of actions specified by the user. For example, the user may create notification settings indicating that if a particular sensed value from a sensor falls above or below a certain value or the user may specify a particular action be performed if particular criteria is satisfied based on the sensed values.

The connected appliances 130 may be devices within the property that exchange communications with the monitoring control unit 110 and the sensors 120. For example, in some instances, the connected appliances 130 may be HVAC components such as a furnace, a compressor, a fan, an evaporator, or a heat exchanger. In this example, the monitoring control unit 110 may control the functions of the connected appliances 130 in response to data received from the sensors 120 during a heating or cooling event. For instance, the monitoring control unit 110 may send an instruction to start the fan after receiving an indication from a temperature sensor on the return vent that the temperature is above the set temperature.

In some instance, the connected appliances 130 may include household objects that are commonly used by property owners and/or used for monitoring occupancy. For example, the connected appliances 130 may include a thermostat, pet water dishes, beds, chairs, windows, doors, or electronic devices. In this example, the system 100 may provide notifications to the property owners to take action based on data collected by the sensors 120 on the connected appliances 130 that may indicate that the connected appliance is being interacted with and thus the area where the connected appliance is located is occupied.

The sensors 120 and the connected appliances 130 may communicate with the controller 112 over communications links 122 and 124, respectively. The communication links 122, 124, and 126 may be wired or wireless data pathways configured to transmit signals between the sensors 120, and the connected appliances 130. The sensors 120, and the connected appliances may periodically transmit sensed values to the controller 112, or may transmit sensed values to the controller 112 in response to a change in a sensed value.

The monitoring control unit 110 may monitor the operation of the sensors 120 and the connected appliances 130 based on exchanging communications with the sensors 120 and the connected appliances 130. For example, the monitoring control unit 110 may receive the measured sensor data from the sensors 120. In response receiving the measured data, the monitoring control unit 110 may monitor the data over certain periods of time. The monitoring control unit 110 may also use the measured data to monitor the operations of the sensors 120 or the connected appliances 130.

The application server 160 may be an electronic device configured to provide control services by exchanging electronic communications with the monitoring control unit 110 and the one or more mobile devices 140, 150 over the network 105. For example, the application server 160 may be configured to monitor data obtained by the monitoring control unit 110. In this example, the application server 160 may exchange electronic communications with the network module 114 included in the monitoring control unit 110 to send and/or receive information regarding activity at the property and/or the environment at the property. The application server 160 also may receive information regarding activity within or external to the property from the one or more mobile devices 140, 150. For example, the application server 160 may receive information from the one or more mobile devices 140, 150 that indicates the locations of the one or more mobile devices 140, 150.

The one or more mobile devices 140, 150 may be devices that host one or more native applications, e.g., the native applications 142, 152. The one or more mobile devices 140, 150 may be cellular phones or non-cellular locally networked devices. The one or more mobile devices 140, 150 may include a cell phone, a smart phone, a tablet PC, a personal digital assistant ("PDA"), or any other portable device configured to communicate over a network. For example, implementations also may include Blackberry-type devices, e.g., as provided by Research in Motion, electronic organizers, iPhone-type devices, e.g., as provided by Apple, iPod devices, e.g., as provided by Apple, or other portable music players, other communication devices, and handheld or portable electronic devices for gaming, communications, and/or data organization. The one or more mobile devices 140, 150 may be the same or may include mobile devices of different types. The one or more mobile devices 140, 150 may perform functions unrelated to the system 100, such as placing personal telephone calls, playing music, playing video, displaying pictures, browsing the Internet, maintaining an electronic calendar, etc.

In some implementations, the one or more mobile devices 140, 150 may communicate with and receive data from the monitoring control unit 110 using the communication link 138. For instance, the one or more mobile devices 140, 150 may communicate with the monitoring control unit 110 using various local wireless protocols, such as Wi-Fi, Bluetooth, Z-Wave, ZigBee, or wired protocols such as Ethernet, USB, and other wired protocols based on the RS232, RS485, and/or RS422 standards. The one or more mobile devices 140, 150 may connect locally to the system 100 and its sensors and other devices. The local connection may improve the speed of communications because communicating through the network 105 with a remote server, e.g., the application server 160, may be slower.

Although the one or more mobile devices 140, 150 are shown communicating with the monitoring control unit 110, the one or more mobile devices 140, 150 may communicate directly with the sensors and other devices controlled by the monitoring control unit 110. In some implementations, the one or more mobile devices 140, 150 may replace the monitoring control unit 110 and perform the functions of the monitoring control unit 110 for local control and long range or offsite communication.

In some implementations, the one or more mobile devices 140, 150 may receive system 100 data captured by the monitoring control unit 110 through the network 105. The one or more mobile devices 140, 150 may receive the data from the monitoring control unit 110 through the network 105 or the application server 160 and may relay data received from the monitoring control unit 110 to the one or more mobile devices 140, 150 through the network 105. In this regard, the application server 160 may facilitate communications between the one or more mobile devices 140, 150 and the monitoring control unit 110.

Although the one or more mobile devices 140, 150 are shown in FIG. 1 as being connected to the network 105, in some implementations, the one or more mobile devices 140, 150 are not connected to the network 105. In these implementations, the one or more mobile devices 140, 150 may communicate directly with one or more of the system 100 components and no network connection, e.g., connection to the Internet, or reliance on remote servers is needed.

In some implementations the one or more mobile devices 140, 150 may be used in conjunction with only local sensors and/or local devices at a property. In these implementations, the system 100 may only include the one or more mobile devices 140, 150, the sensors 120, or the connected appliances 130. The one or more mobile devices 140, 150 may receive data directly from the sensors 120, and the connected appliances 130, and send data directly to the monitoring control unit 110. The one or more mobile devices 140, 150 may provide the appropriate interfaces/processing to provide control information, modify settings, control HVAC unit component operations, etc.

In some implementations, a mobile device 140, 150 may be able to determine a geographic location associated with the mobile device 140, 150, and may communicate information identifying a geographic location associated with the mobile device 140, 150. For example, a mobile device 140, 150 may determine the current geographic location of the mobile device 140, 150 by using global positioning system (GPS) capabilities. In some implementations, a geographic location associated with a mobiles device 140, 150 may be determined using other methods, for example, by using Wi-Fi access point triangulation data, cellular network triangulation data, or IP address information, when the mobile device 140, 150 has network connectivity. The mobile device 140, 150 may transmit data identifying the geographic location of the mobile device 140, 150 over the network 105 to the application server 160, or to the monitoring control unit 110.

The one or more mobile devices 140, 150 may each include a native application 142, 152, respectively. The native application 142, 152 refers to a software/firmware program running on the corresponding mobile devices that enables the features described throughout. The one or more mobile devices 140, 150 may load or install the native application 142, 152 based on data received over a network or data received from local media. The native monitoring application 142, 152 may run on mobile devices' platforms, such as Apple iOS, iPhone, iPod touch, Blackberry, Google Android, Windows Mobile, etc.

The native application identifies a geographic location associated with the mobile device 140, 150 and communicates information identifying the geographic location. For example, a mobile device 140, 150 having the native application 142, 152 may determine a geographic location of the mobile device 140, 150 using GPS capabilities, and may communicate data identifying the geographic location to the application server 160. In some instances, the native application 142, 152 may check the location of the mobile device 140, 150 periodically and may automatically detect when a user associated with the mobile device 140, 150 is going toward or away from a property.

Figure 6A:
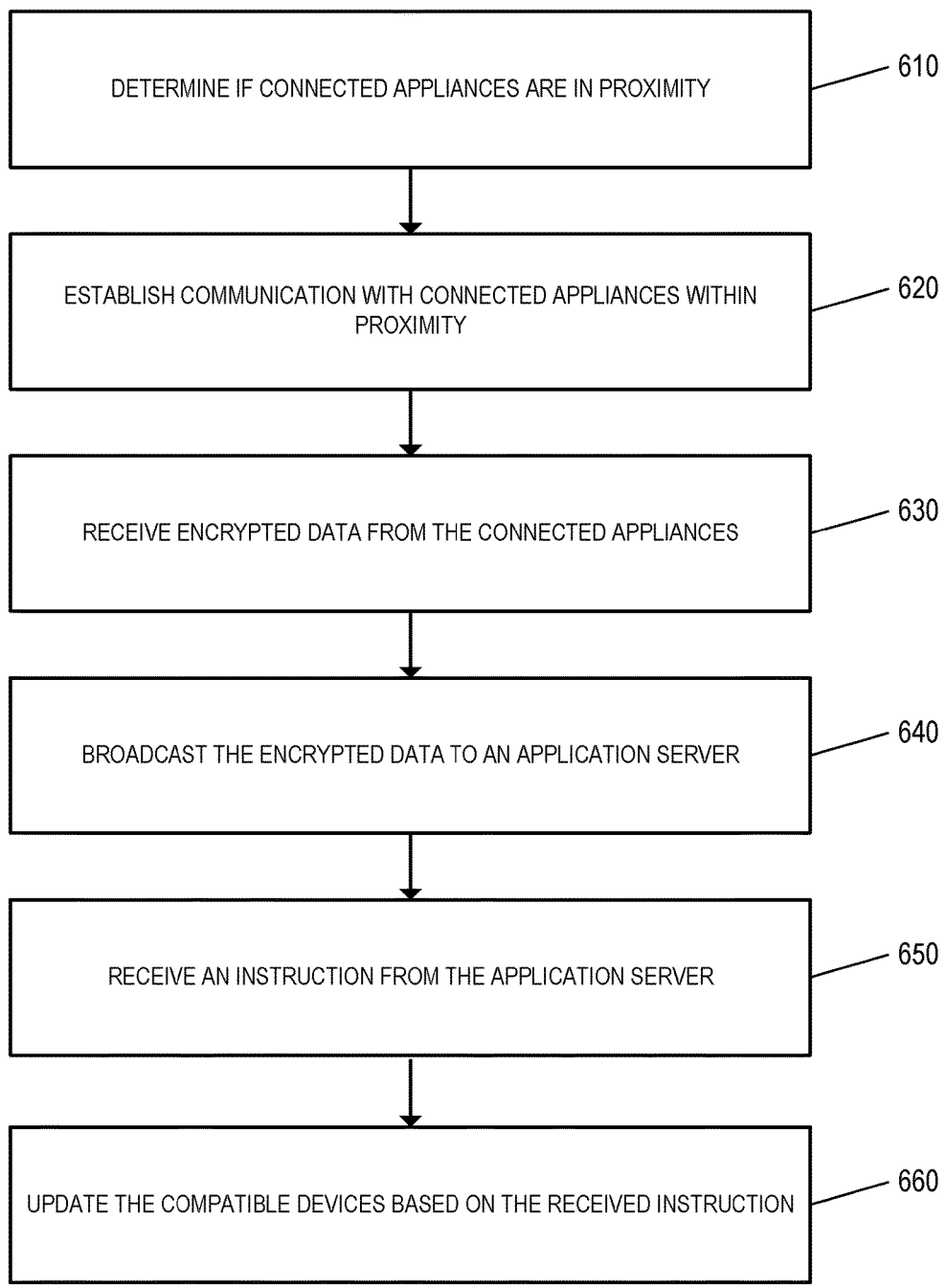
FIGS. 6A-6C illustrate example of a connection platforms for distributed sensor networks.

In some implementations, the sensors 120 and the connected appliances 130 may transmit data to the application server 160 over the network 105. For example, as represented in FIG. 6A, the connected appliances 130 may transmit measured data by the sensors 120 to the application server 160 through an encrypted connection provided by a mobile device when the connected appliances 130 are within a certain proximity from the mobile device (e.g., five feet away). The application server 160 may then process the transmitted data and perform an analysis based on historical data collected by the sensors 120 and transmit an instruction to the connected appliances to perform a particular operation (e.g., power on, power off, lower settings, etc.).

In some implementations, the sensors 120 may be placed on objects within commercial properties (e.g., hotels, office buildings, etc.) that require reoccurring maintenance. For example, the sensors 120 may be placed on soap dispensers and may indicate the soap level with the dispensers and transmit a notification to maintenance personal in response to determining that the dispenser is empty. In another example, the sensors 120 may be placed on objects commonly used by users (e.g., toilet flushers, soap, paper towel dispensers) and report the amount of usage during particular intervals (e.g., daily). In such examples, the system 100 may track historical reports of usage patterns and in response to the sensor displaying an abnormally large or abnormally small usage, determine that the object may require maintenance.

In some implementations, the sensors 120 and the connected appliances 130 may transmit data to the application server 160 over the network 105 only within specified time frames or for a finite number of connections below a daily token limit to reduce signal transmission and preserve bandwidth for more important transmission such as transmitting alarm signal data. For example, the application server 160 may provide a mobile device with a day's worth of tokens that are each valid for a particular time frame of the day, and when a mobile device is connecting with the connected appliances 130, the connected appliances 130 may verify that the mobile device is authorized to communicate with the connected appliances 130 based on determining that the mobile device possesses a token for that particular time frame.

The system 100 may be implemented in variety of types such as residential properties, commercial properties, or rental properties. For example, when implemented in residential properties, the connected appliances 130 may include common household appliances and the sensors 120 may include household sensors that monitor the conditions within the residential property. When implemented in commercial properties, the system 100 may additionally include distributed networks of connected appliances 130 and sensors 120 configured to the monitor control unit 110 for different regions of the property.

Figure 2:
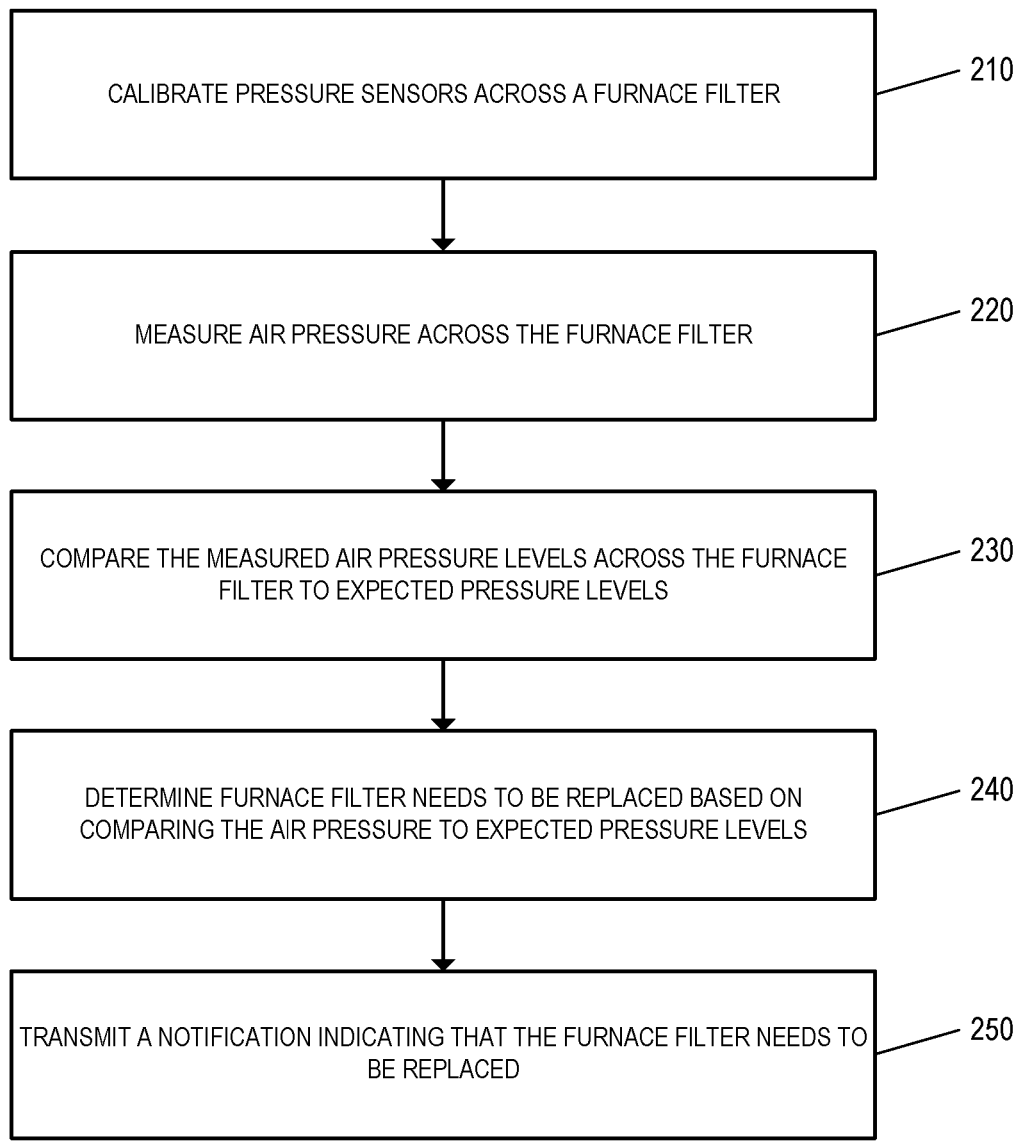
FIG. 2 illustrates an example of a process for monitoring air pressure.

FIG. 2 illustrates an example process 200 that may be used for monitoring air pressure. Although the operation of example processes 200-500, 600A and 600B are described generally as being performed by the system 100, the operations of the example processes 200-500, 600A and 600B may also be performed by one of the components of the system 100 (e.g., the monitoring control unit 110) or may be performed by any combination of the components of the system 100. In some implementations, operations of the example processes 200-500, 600A and 600B may be performed by one or more processors included in one or more electronic devices.

The system 100 may calibrate pressure sensors across a furnace filter (210). For example, the system 100 may initially perform a pressure differential between a pressure sensor embedded in a duct surrounding a furnace filter and a pressure sensor embedded on the opposite side of the furnace filter. In this example, the system 100 may calibrate the pressure sensors when the HVAC fan is turned off so that the expected pressure differential across the furnace filter is calibrated to zero. In some instances, the calibration process may be an ongoing process that may take place at particular times before or after a heating/cooling event, or at certain time intervals (e.g., daily checkups) based on the scheduled operations of the HVAC unit.

The system 100 may measure air pressure across the furnace filter (220). For example, in some instances, the system 100 may include at least two independent pressure sensors placed on opposite sides of the furnace filter. In this instance, the system 100 determines the pressure across the furnace filter by calculating the difference between pressure sensors placed on opposite sides of the furnace filter. The pressure sensors may be embedded in the duct surrounding the filter and the actual filter itself. In this instance, the air pressure across the filter may be determined based on using the air pressure of the air ducts as a reference measurement.

The system 100 may compare the measured air pressure levels across the furnace filter to expected pressure levels (230). For example, the system 100 may compare the measured pressure levels by the pressure sensors against a sensitivity graph that correlates expected air pressures for various fan powers. In this example, the system 100 may use the expected pressure levels to determine if the pressure sensors measure an abnormally high or abnormally low pressure across the furnace filter given the current operating power of the fan.

The system 100 may determine that the furnace filter needs to be replaced based on comparing the air pressure to expected pressure levels (240). For instance, if the measured pressure level across the filter is above the expected pressure level, then the system 100 may determine that dirt on the filter may be preventing adequate air flow through the filter. In such instances, the system 100 may also have tolerance intervals for abnormally measured pressure levels that correspond to the attributed reduction in filter performance. In another instance, if the measured pressure level across the filter is not above the expected pressure level, then the system 100 may determine that dirt on the filter is not preventing adequate air flow through the filter.

The system 100 may transmit a notification indicating that the furnace filter needs to be replaced (250). For example, after determining that the measured pressure levels are abnormal based on comparing to expected pressure levels, the system 100 may transmit a notification to the one or more mobile devices 140, 150 over the network 105. In such examples, the notification may include an alert or an instruction informing the user that the air filter may need to be replaced. In some instances, the alert may also include historical pressure level data from a particular time period (e.g., six months) to indicate the performance degradation. The notification may also provide information on which specific furnace filter may need to be replaced if there are multiple filters present within the property. In some instances, the notification may vary based on the severity of the air pressure level abnormality. For example, the system 100 may have several tolerance ranges for abnormal pressure levels and may provide different notifications accordingly. For instance, if the abnormal pressure level is severe enough to significantly impact the HVAC unit, the system 100 may indicate the severity in the notification provided to the one or more mobile devices 140, 150.

Figure 3:
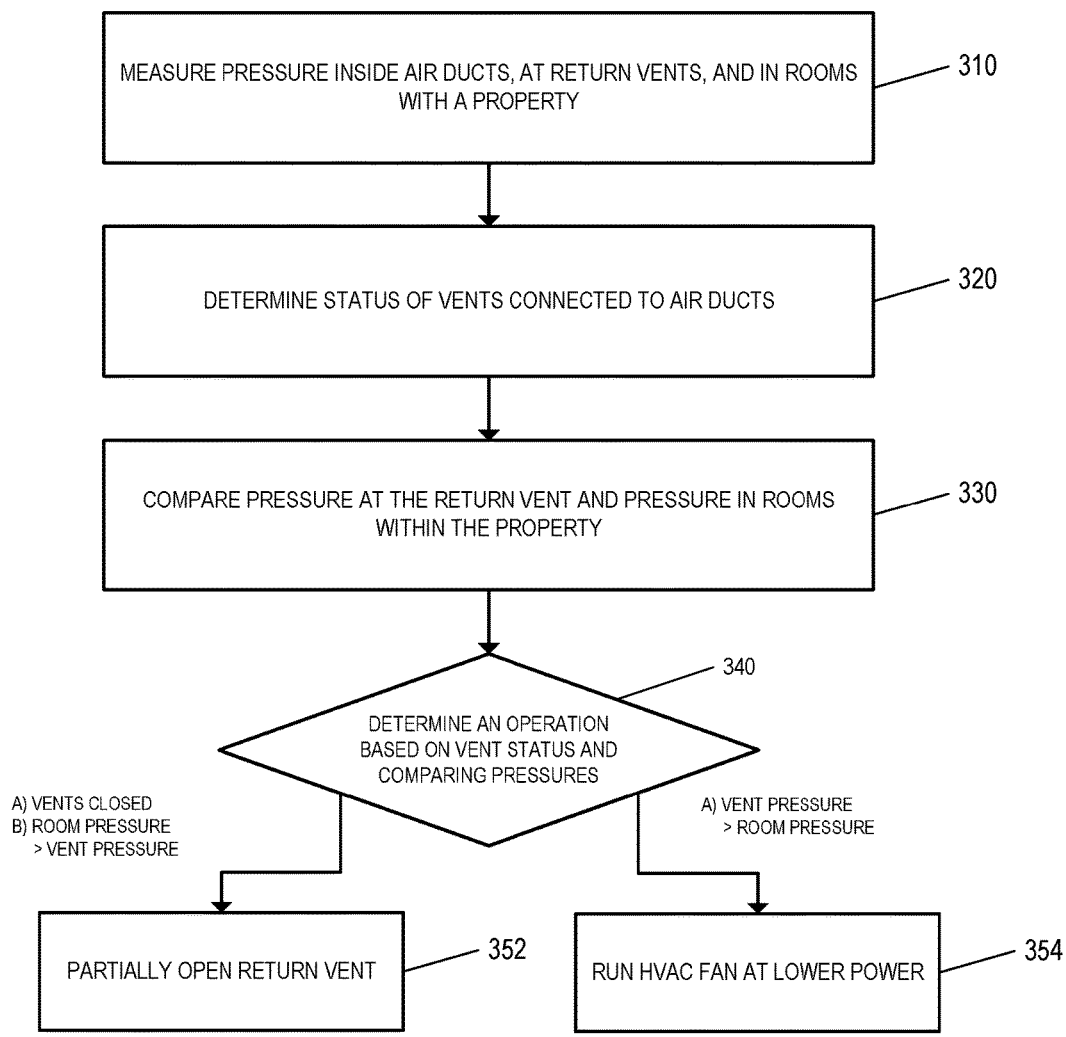
FIG. 3 illustrates an example of a process for balancing HVAC performance.

FIG. 3 illustrates an example process 300 for balancing HVAC performance. The system 100 may initially measure pressure inside air ducts, at return vents, and in rooms within a property (310). For example, the system 100 may include pressure sensors placed inside the air ducts, the return vents, and inside different rooms within the property to monitor the pressure levels at each individual location. The system 100 may also use these separate measurements to determine air flow throughout the property from the air ducts, to the vents and eventually through the rooms within the property.

The system 100 may determine status of vents connected to air ducts (320). For example, the system 100 may include sensors on the return vents connected to the air ducts that indicate if the vent is currently in an open or closed position. The system may use the vent status as an indicator to determine if pressure level differences between the air ducts and the rooms within the property may be attenuated by opening or closing the vents. The vents may also include a motor configured to the status sensors that enable the system 100 to open and close the vents based on the measured pressure levels in the air ducts, at the return vents, and in rooms within the property.

The system 100 may compare pressure at the return vent and pressure in rooms within the property (330). For example, the system 100 may compare the measured pressure level at the return vent to the measured pressure level in the rooms within the property to determine if there is a disparity based on external factors. For example, if the pressure level within the room is significantly lower than the pressure level measured at the return vent, then the system 100 may identify potential sources of loss, such as insufficient sealing, open windows or doors, or blocked filters, that may be contributing to the difference in measured pressure levels.

The system 100 may determine an operation to perform based on vent status and comparing pressures (340). For example, after determining the vent status (e.g., open or closed) and comparing the pressure levels at the return vent and a room within the property, the system 100 may determine why there may be a pressure differential. For example, the system 100 may determine that the vent being closed may contribute to why there is a significant pressure level differential between the return vent and the room and in response, determine to open the vent. In another example, the system 100 may compare the pressure level of the return vent to the room pressure and determine that the vent pressure is greater than the room pressure when the vent is closed, and in response, transmit a signal to run the HVAC fan at a lower power to reduce the pressure differential.

In some implementations, the system 100 may be coupled with occupancy sensors to determine differences in pressure levels measured at the return vents and the rooms within the property. For example, occupancy sensors may be placed on doors and windows to determine if they are open or closed, and coupled with motors to control operations to reduce pressure level disparities. For instance, after the system 100 determines a pressure level disparity between the return vent and a room within the property, the system 100 may receive indications from occupancy sensors that a window may be open. In response, the system 100 may transmit instructions to close the windows to reduce the pressure level disparity.

The system 100 may partially open return vents if the vent status indicates that the return vents are closed and/or the pressure comparison indicates that the room pressure exceeds the vent pressure (352). For example, the system 100 may control the vents by transmitting an instruction to the motors to partially open the return vent to reduce the pressure level disparity between the return vent and the room. In this example, the system 100 may initially determine that the disparity in pressure levels results from the prevention of air flow from the air ducts to the room through the return vent during a heating or cooling operation. In response, the system 100 may partially open the return vent to reduce the buildup pressure within the air ducts.

The system 100 may run the HVAC fan at lower power if the pressure comparison indicates that the vent pressure exceeds the room pressure (354). For example, the system 100 may initially determine, based on the current status of the return vent, that it is open. In this example, the system 100 may lower the HVAC fan to reduce the air flow pressure within the air ducts because the return vent is currently open. In some instances, the system 100 may also compare data generated by other components within the system 100 (e.g., sensors 120, connected appliances 130, etc.) to determine if reducing the HVAC fan power may impact the current heating or cooling operation. For example, if a thermostat indicates that the room temperature is significantly below the set point, there is a pressure disparity between the return vent and the room, and the return vent is open, the system 100 may determine that reducing fan speed may impede the current heating operation. In these examples, the system 100 may perform other operations (e.g., closing windows or doors or prompting a user to close a window or door) to alternatively reduce the pressure disparity between the return vent and the room without impacting the heating operation.

Figure 4:
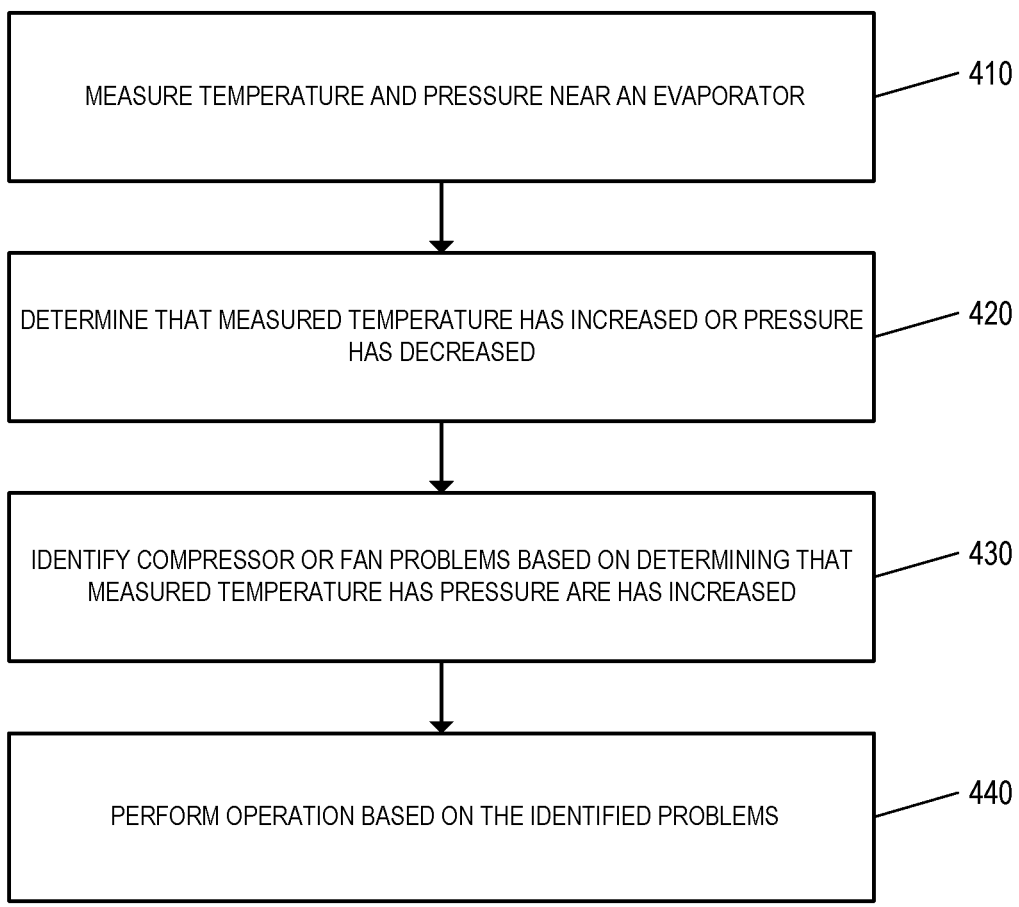
FIG. 4 illustrates an example of a process for identifying HVAC problems.

FIG. 4 illustrates an example process 400 for identifying HVAC problems. The system 100 may initially measure temperature and pressure near an evaporator (410). For example, the system 100 may include temperature and pressure sensors placed near an HVAC evaporator to measure temperature and pressure. In some instances, the temperature and pressure may be monitored continuously over time to track usage patterns. In some instances, the temperature and pressure may be monitored over particular time intervals (e.g., hourly) to conserve power in tracking usage patterns.

The system 100 may determine that the measured temperature has increased or pressure has decreased (420). For example, the system 100 may monitor the measured temperature to determine if the temperature is increasing over time, and monitor the measured pressure to determine if the pressure is decreasing over time.

The system 100 may identify compressor or fan problems based on determining that the measured temperature has increased or the measured pressure has decreased (430). For example, the system 100 may diagnose problems with the compressor or fan based on identifying increasing temperatures or decreasing pressures. For example, decreasing pressures may indicate that the fan is malfunctioning or underpowered and is failing to produce the sufficient air flow to maintain the measured pressure. In another example, an increasing temperature may indicate that an evaporator is overheating due to problems relating to heat exchange, thermal diffusion, and/or component failure. In yet another example, increasing temperatures may indicate that the compressor is experiencing electrical problems because of increased resistance causing internal overload. In other examples where there is both increasing temperature and decreasing pressure over time, the system 100 may initiate a diagnostic test of individual components to determine the exact nature of the problem.

The system 100 may perform an operation based on the identified problems (440). For example, in response to identifying problems with either the fan or compressor, the system 100 may adjust the operation of the fan or the compressor. For example, if the system 100 determines the fan may be malfunctioning by producing insufficient airflow, the system 100 may temporary disable the current heating or cooling operation to prevent further damage to the HVAC unit. In another example, if the system 100 determines that the compressor may have electrical problems, the system 100 may only disable certain HVAC components while running the fan to mitigate the effects on the current heating or cooling operations. Where the system 100 is unable to diagnose the exact identified problem with the HVAC unit, the system 100 may transmit an alert to the one or mobile applications 142, 152 indicating that the HVAC unit may require service and indicate what prompted the alert to be sent. In some instances where the problem is severe and may impact the multiple HVAC unit components, the system 100 may temporarily suspend all heating or cooling operations to prevent further system damage resulting from usage.

Figure 5:
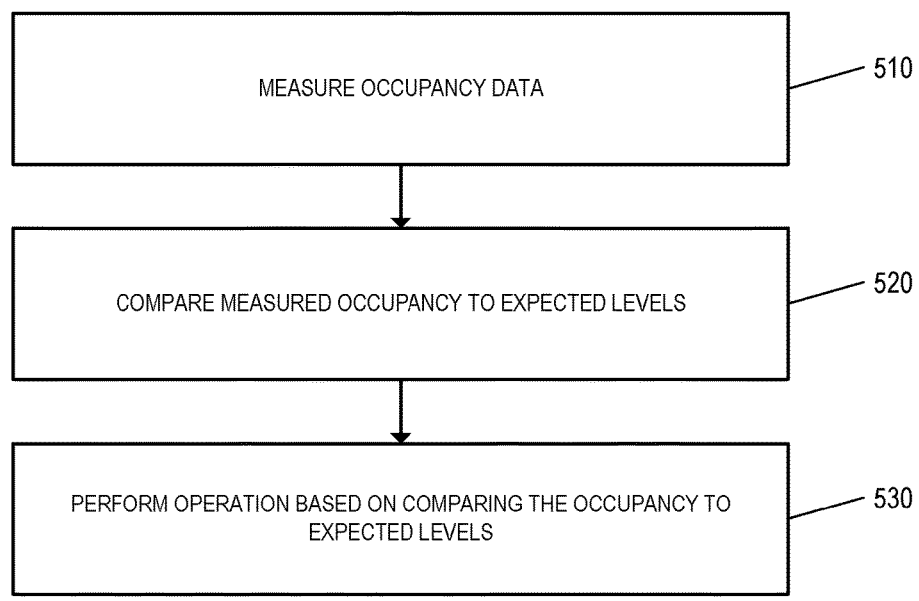
FIG. 5 illustrates an example of a process for monitoring occupancy data.

FIG. 5 illustrates an example process 500 for monitoring occupancy data. The system 100 may initially measure occupancy data (510). For instance, the system 100 may use proximity, motion, and pressure sensors to determine when an object within the property may be in use. In one example, the system 100 may include a motion sensor placed on a bed to measure movement during nighttime. In another example, the system 100 may include motion sensors on doors and windows to determine their configuration and impact on whether a room is occupied. In other examples, sensors may be placed on common objects and the system 100 may determine occupancy based on usage of the objects.

The system 100 may compare measured occupancy to expected levels (520). For example, the system 100 may initially measure occupancy data to determine a baseline activity level for a particular appliance or object. For instance, motion sensors on a bed may initially measure baseline movements over a certain period of time (e.g., one month) to define the expected level of movement. In this instance, the system 100 may then measure movement and compare it to the expected to level to determine if there are any deviations from the expected level. In some implementations, motion sensors on doors and windows may initially determine usage patterns to determine a baseline occupancy level that indicates a property owner's typical schedule. In this instance, the system 100 may compare the current configuration of the windows and doors to determine if they are abnormal compared to the baseline occupancy level. In some instances, abnormal configurations may be used to determine if a security event has taken place. The sensors placed on objects may be used to determine expected levels to maintain the object. For example, a water level sensor may be used to determine the amount of liquid that should constantly be present within a water tank. In this example, the water level sensor may measure instantaneous water levels in the water tank and compare it to the expected baseline level.

In some implementations, the system 100 may include distributed networks of different types of sensors that transmit data to the monitoring control unit 110. For example, the system 100 may correlate temperature data from temperature sensors and occupancy data from motion sensors to determine insights that may impact operations of the components within the property. For example, if the temperature is above the thermostat set point, and occupancy data suggests that the property owner is not currently within the property, the system 100 may adjust the operations of the HVAC unit to conserve energy in performing heating and cooling operations.

The system 100 may perform operations based on comparing the occupancy to expected levels (530). For example, in response to determining that the occupancy data is not at the expected levels, the system 100 may perform various operations to impact the functions of objects and/or appliances within the property. For instance, the system 100 may send a notification to the property owner to refill the pet water dish after determining that the water level is below the expected level. After determining that the motion on the bed exceeds the expected level for motion, the system 100 may adjust the temperature and humidity settings on a thermostat to adjust the set point for the room where the bed is located in. For example, the system 100 may lower the temperature set point by a few degrees or reduce a humidity set point. In some instances, the system 100 may automatically adjust the operations of appliances based on occupancy data. For example, if the user property owner is currently not within the property, the system 100 may conserve energy by reducing cooling and heating operations.

FIG. 6A illustrates an example connection platform based on an encrypted cloud connection for a distributed sensor network. The system 100 may initially determine if connected appliances are in proximity (610). For example, the system 100 may include sensors 120 that detect when the connected appliances 130 are within a certain range from a mobile device (e.g., five meters). For instance, in one particular example, a device sensor on a clock within the property may determine that a mobile device is within range when a property owner enters a room. In this instance, the connected appliances 130 may include mobile devices capable of establishing a communication with the clock within the property.

The system 100 may establish communication with connected appliances within proximity (620). For example, after determining that the connected appliances 130 are within range to the mobile device, the sensors may establish a connection that allows data exchange with the connected appliances 130 and the mobile device. For instance, in one particular example, the system 100 may establish a connection with the mobile device and a clock to determine whether the time on the clock should be changed.

The system 100 may receive encrypted data from the connected appliances (630). For example, the connected appliances 130 may transmit encrypted data to the mobile device via a short-range communication protocol for the mobile device to forward the encrypted data to an application server of the system 100 over the network 105. The data transmitted by the connected appliances to the mobile device for forwarding to the application server may initially be encrypted to protect the information within the data transmission. The system 100 may encrypt the data transmission using a data encryption standard such as a symmetric-key method.

The system 100 may broadcast the encrypted data to an application server (640). For example, the system 100 may broadcast the received encrypted data from the connected appliances 130 to the application server 160 over the network 105. For instance, in one particular example, the mobile device may relay encrypted time and data information received from the clock by the mobile device. In response, the application server 160 may then decode the transmission and send an instruction to the mobile device.

The system 100 may receive an instruction from the application server (650). For example, the application server 160 may transmit an instruction to the system 100 including an alert to the property owner that an issue requires their attention. For instance, in one particular instance, the server 160 may send an alert to the mobile device with an alert indicating that one or more clocks within the property may be need to be synchronized with the mobile device. The alert may provide options to the user to perform a synchronization, ignore the alert, or provide more information about the discrepancies in the time/date and which devices may be impacted by the synchronization.

The system 100 may update compatible devices based on the received instruction (660). For example, after receiving a user input from the property owner, the system 100 may perform a specified operation on compatible devices based on the data received from the connected appliances 130. For instance, in one particular application, the system 100 may update the clock in communication with the mobile device using a date and time indicated by the mobile device.

Figure 6B:
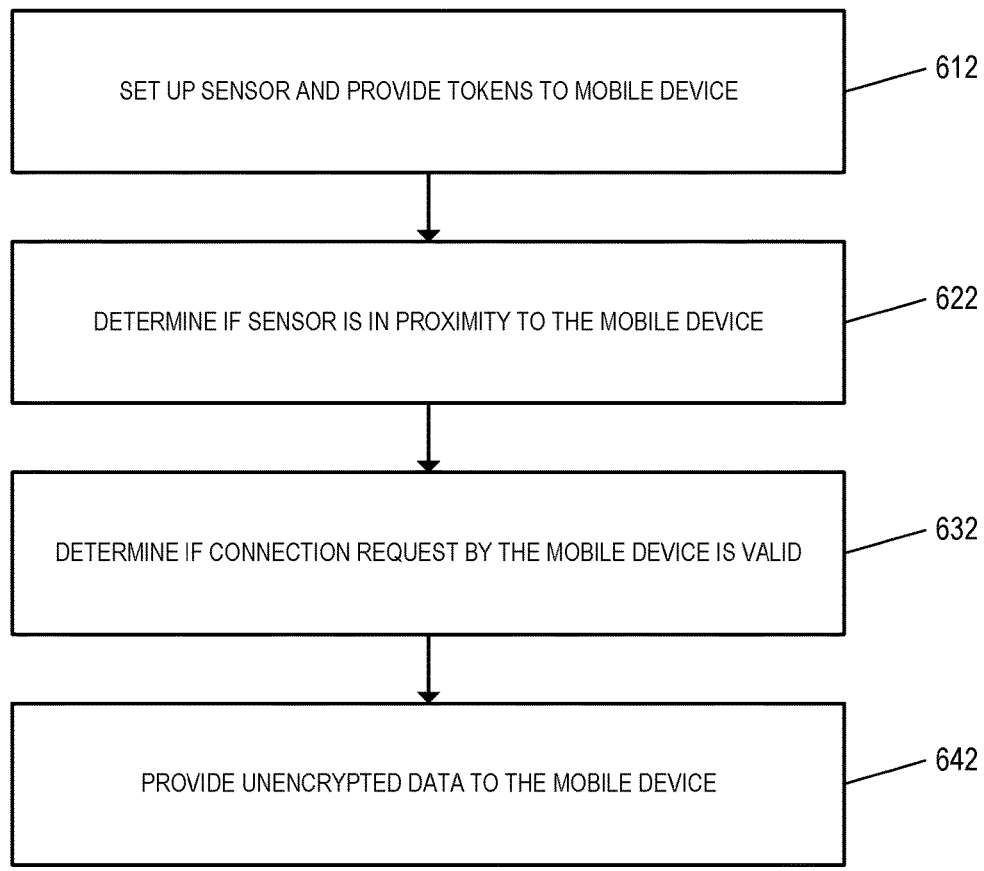

FIG. 6B illustrates an example connection platform for a distributed sensor network using a mobile device. In this example, the system 100 may provide security using tokens when the mobile device may not be in communication with an application server 160 and the mobile device is connecting to a sensor. The system 100 may initially set up a sensor and provide tokens to a mobile device (612). For example, the application server 160 and sensor may both include token generators that may generate pseudo-random tokens based on a time and a seed value. Accordingly, the application server 160 and sensor may be set up with the same seed values so that they generate the same tokens for the same times. In the example, the application server 160 may additionally provide the mobile device with tokens for that day on a daily basis. Accordingly, the mobile device may receive tokens from the application server 160 that match the tokens that will be generated by the sensor. In such examples, the application server 160 may provide different tokens corresponding to different time intervals within the specified time period (e.g., 24 unique tokens that are each valid for a particular one hour time slot during the day).

The system 100 may determine if a sensor is in proximity to the mobile device (622). For example, the system 100 may include sensors 120 that detect when the sensors 120 are within a certain range from a mobile device (e.g., five meters). For instance, in one particular example, a device sensor on a clock within the property may determine that a mobile device is within range when a property owner enters a room.

The system 100 may determine if a connection request by the mobile device is valid (632). For example, a mobile device may initially provide a request to connect with a sensor. The mobile device may include a token corresponding to the current time and previously received from the application server, and in response, the sensor may determine whether the token matches a token generated by the sensor for the current time. If the token provided by the mobile device is invalid because it does not match the token generated by the sensor, the connection request with the sensor may refused. If the token provided by the mobile device matches the token generated by the sensor, a connection with the mobile device and the sensor may be established. In some implementations the mobile device may be resilient to time drift. For example, the mobile device may provide a token for a current time period, a token for a previous time period, a token for a next time period, etc., as appropriate.

The system 100 may provide unencrypted data to the mobile device (642). For example, after the mobile device establishes a connection with a nearby sensor, the sensor may transmit unencrypted data to the mobile device. In such examples, the data transmitted from the sensor may need not be encrypted because the token request validation by the sensor may be a form of authentication to prevent unauthorized access of data stored on the sensor. The mobile device may then analyze the unencrypted data. For example, the mobile device may receive time information from a clock sensor, determine that the time is incorrect, and present an option for the user to correct the time. In some implementations, the sensor may still provide encrypted data for the mobile device to decrypt or for the mobile device to provide the encrypted data to a server to decrypt.

Figure 6C:
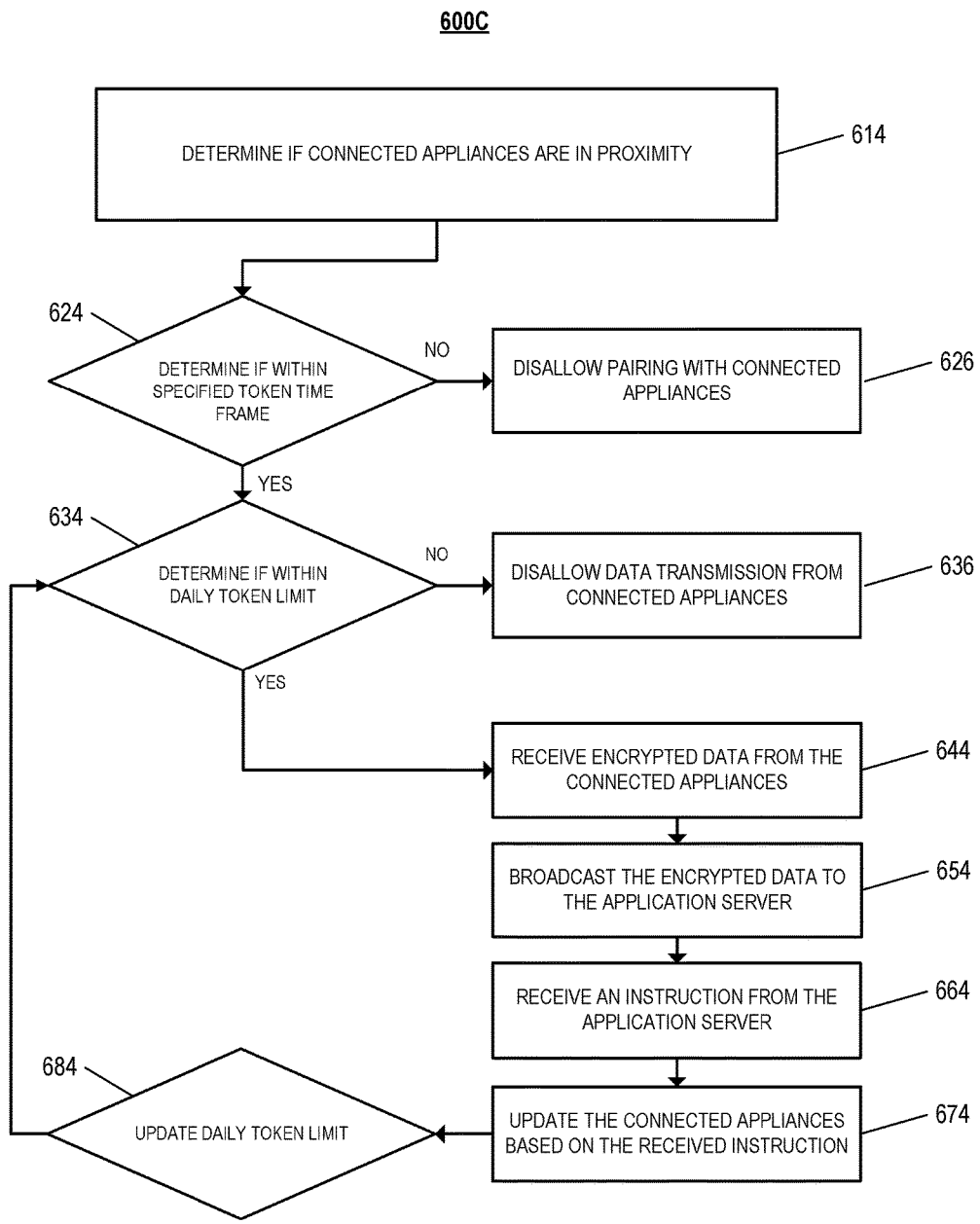

FIG. 6C illustrates an example restricted connection platform based on time and connection limits. The system 100 may determine if connected appliances are in proximity (614). For example, the system 100 may include sensors that detect when the connected appliances 130 are within a certain range from the mobile device (e.g., five meters). For instance, in one particular example, a device sensor on a PC within a commercial property may determine that a mobile device is within range when maintenance personnel carrying the mobile device enters a room. In this instance, the connected appliances 130 may include employee mobile devices capable of establishing a connection bridge with the PC within the commercial property.

The system 100 may determine if the current time is within specified token time frame (624). For example, the system 100 may include specifications that allow data exchange between connected appliances 130 only during specified time periods (e.g., between 7 A.M. and 9 A.M.). For instance, in one particular example, the employee mobile devices may only be capable of establishing a connection bridge with the PC within the commercial property within the specified time period.

In some implementations, the specified token time frame may be an access code provided to the one or more connected appliances 130 that allows data exchange for a particular time period (e.g., twenty four hours). In such instances, the access code provided may be used to provide access to the one or more connected appliances 130 within the particular time period. After the particular time period has ended, the access code may be inactivated and the one or more connected appliances 130 are no longer able to exchange data.

The system 100 may disallow pairing between connected appliances and application server if outside the specified token time frame (626). For example, if the system 100 determines that the current time is outside the specified token time frame, then it may prevent any incoming data transmissions from connected appliances 130 that may be within proximity to the device sensor in the location.

The system 100 may determine if within daily token time limit (634). For example, in addition to determining if the current time is within the specified token time frame, the system 100 may track the daily token limit of data transmissions from the connected appliances. In this example, the daily token limit may be a threshold number of daily data transmissions from a particular device to the system 100. For instance, in one particular example, the token limit may represent the maximum number of employee purchase orders transmitted from employee mobile devices to a supply PC within commercial property.

The system 100 may disallow data transmission from connected appliances if the number of transmissions exceed the daily token limit (636). For example, if the connected appliances 130 exceeds the daily token limit, the system 100 may prevent incoming data transmissions from the connected appliances that have exceeded the daily limit. For instance, in one particular example, the system 100 may prevent purchase orders from employee mobile devices when the number of orders submitted to the supply PC within the commercial property exceeds a daily limit (e.g., five orders). In some implementations, the daily token limit may vary based on the specific type of connected appliance and by the employee using the appliance. For instance, different devices or services may have different daily token limits based on the needs of the commercial operations and users may have different limits based on the user definitions specified within the system 100.

The system 100 may receive encrypted data from the connected appliances (644). For example, the connected appliances 130 may transmit data to the system 100 over the network 105. For instance, in one particular example, the employee mobile device may transmit a purchase order to the system 100 with necessary supplies that need to be ordered.

The system 100 may broadcast the encrypted data to an application server (654). For example, the system 100 may broadcast the received encrypted data from the connected appliances 130 to the application server 160 over the network 105. For instance, in one particular example, the system 100 may broadcast purchase orders received from the employee mobile devices to the application server 160. In response, the application server 160 may then decode the transmission and send an instruction to the employee mobile device.

The system 100 may receive an instruction from the application server (664). For example, the application server 160 may transmit an instruction to the system 100 including an alert to the property owner that an issue requires their attention. For instance, in one particular example, the application server 160 may transmit an instruction to the supply PC to identify the purchase orders submitted by the employee mobile devices to the system 100.

The system 100 may update compatible devices based on the received instruction (674). For example, after receiving a user input from the property owner, the system 100 may perform a specified operation on compatible devices based on the data received from the connected appliances 130. For instance, in one particular example, the system 100 may transmit the purchase orders to the supply PC over the network 105. In response, the supply PC may process the purchase order and transmit corresponding orders to manufacturers.

The system 100 may update daily token limit (684). For example, after transmitting the instruction from the application server 160, the system 100 may update the daily token limit for the connected appliances 130. For instance, in one particular example, after the supply PC has fulfilled the purchase orders from the employee mobile devices, the system 100 may reduce the remaining daily token limit for the employee mobile devices such that any additional orders for the day may be compared to a lower token limit in step 632 of the process 600B.

Figure 7:
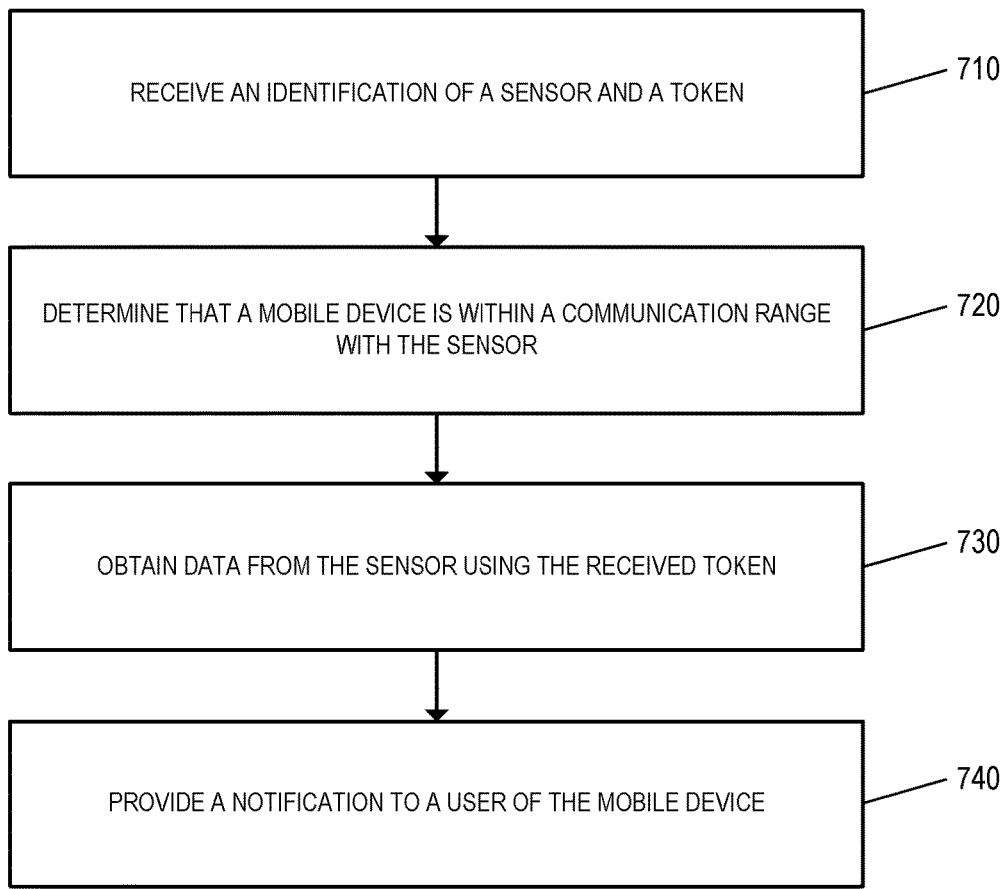
FIG. 7 illustrates an example of a process for exchanging data over a distributed sensor network.
Figure 8:
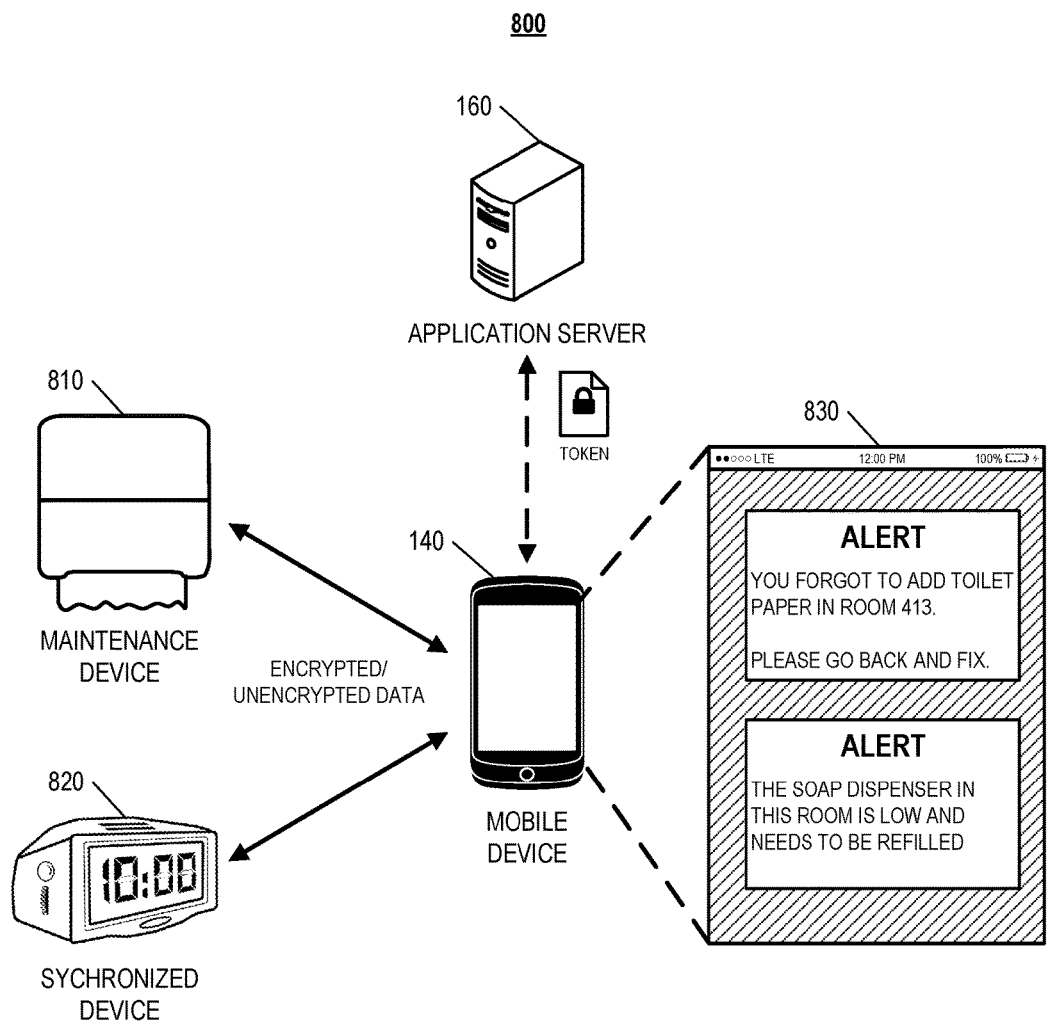
FIG. 8 illustrates a diagram of devices connected over a distributed sensor network.

FIG. 7 illustrates an example of a process 700 for exchanging data over a distributed sensor network. Briefly, the process 700 may include receiving an identification of a sensor and a token (710), determining that a mobile device is within a communication range with the sensor (720), obtaining data from the sensor using the received token (730), and providing a notification to a user of the mobile device (740). Examples of devices that are involved within the process 700 are depicted in FIG. 8.

In more detail, the process 700 may include receiving an identification of a sensor and a token (710). For instance, the mobile device 140 may receive an identification of the sensor 120 and a token that enables the mobile device 140 to obtain data from the sensor 120 from the application server 160. As described previously with respect to FIGS. 6A-6C, the token may be used for a variety of purposes (e.g., decrypt encrypted data obtained from the sensor 120, limit the number of times in which the mobile device 140 may exchange communications with the sensor 120, limit a duration during which the mobile device 140 may exchange communications with the sensor 120, etc.). The identification of the sensor 120 may include information associated with a wireless communication protocol used by the sensor 120 (e.g., near-field communication, low energy Bluetooth, infrared signals, etc.). In this regard, the identification of the sensor 120 can be used by the mobile device to detect and/or establish communications with the sensor 120. In some implementations, the mobile device 140 may receive the identification and token on a periodic basis. For example, at midnight every day the mobile device 140 may receive the identifications and tokens for all sensors in rooms that a user of the mobile device 140 is expected to maintain.

The process 700 may include determining that a mobile device is within a communication range with the sensor (720). For instance, the mobile device 140 may determine that the sensor 120 is within a communication range with the sensor 120 that is indicated by the identification from the server. The communication range may be dependent on a range that the mobile device 140 and sensor 120 may communicate using short range wireless communication. For example, the communication range may be five meters where transmissions from the mobile device 140 or the sensor 120 are too weak to be received by the other when the mobile device 140 and sensor 140 are more than five meters apart. In some implementations, the communication range may be dependent on obstacles between the mobile device 140 and the sensor 120. For example, material that separates rooms may block signals from the mobile device 140 in one room from reaching a sensor in another room even if the mobile device 140 and sensor are less than five meters apart.

In some implementations, the communication range may be defined by the application server 160. In some instances, where the system 100 is used with commercial properties, the communication range may be configured based on the size associated with a particular region associated with the property (e.g., size of a hotel room that includes the sensor 120). Additional descriptions related to proximity determinations are described previously with respect to FIGS. 6A-6B.

In some implementations, the sensor 120 may be capable of periodically transmitting broadcast signals that identify the sensor to devices within the communication range. In such implementations, the mobile device 140 initially receives the broadcast signal from the sensor 120 once the mobile device 140 is within the communication range. In response, the mobile device 140 may use the identified sensor information included within the broadcast signal in order to establish communications with the sensor 120 and obtain sensor data.

The process 700 may include obtaining data from the sensor using the received token (730). For instance, in response to determining that the sensor 120 is within the communication range with the mobile device 140, the mobile device 140 may obtain data from the sensor 120 using the token received from the sensor 120. As described previously with respect to FIGS. 6B and 6C, in some instances, the token may be used to establish a connection between the mobile device 140 and the sensor 120. For example, a token may be valid for only a particular day and the sensor 120 may refuse to establish a connection and provide data to a device that does not provide a valid token to the sensor 120.

In some instances, the token may be used to decrypt data from the sensor 120. For example, the sensor 120 may encrypt data so that the encrypted can only be decrypted by a valid token. Accordingly, the mobile device 140 may receive encrypted data from the sensor 120 without a token, but may only decrypt the encrypted data using the valid token. In other instances, the mobile device 140 may receive encrypted data from the sensor 120 and provide the encrypted data to an application server, the application server may determine that the mobile device 140 should receive decrypted data from the sensor 120, and in response, provide the decrypted data to the mobile device 140.

Additionally or alternatively, after decrypted the data the application server may determine that the mobile device 140 should instruct the sensor to perform an action. For example, the application server may determine that a clock is set to the wrong time and that an instruction may be provided to the clock to set the clock to the correct time. In response, the application server may then provide a token to the mobile device 140 to transmit to the sensor 120 to show that the mobile device 140 has authority to request that the sensor 120 perform the action. In some implementations, the token may be valid for a period of time or be valid for only one or more uses, similarly to as described above for a token that may be used to establish a connection. Additionally or alternatively, the token may be associated with the action for the sensor 120 to perform. For example, the token may only be used for requesting that a time to be set to another time. In some implementations, the application server may provide the token no in response to determining that the mobile device 140 should instruct the sensor to perform an action, but instead in response to determining that the mobile device 140 has provided encrypted data for the sensor and that the sensor can be instructed by the mobile device 140 to perform an action.

The process 700 may include providing a notification to a user of the mobile device (740). For instance, the mobile device 140 may provide a notification that provides information related to the data obtained from the sensor 120. In one example, the notification may include a request to update information associated with the sensor 120 (e.g., a current time for an alarm clock associated with the sensor 120). In this example, the obtained data may be transmitted to the application server 160 and then compared against a set of reference data. In another example, the notification may include a prompt instructing the user to perform a manual action based on the obtained data from the sensor 120. In this example, the data obtained from the sensor 120 may be used to track maintenance operations performed on devices that is associated with the sensor 120 (e.g., a toilet paper dispenser with a dispenser sensor, or a soap dispenser with an associated sensor).

In some implementations, the notification that is provided to the mobile device 140 may instead be provided to one or more additional devices that are associated with the property where the sensor 120 is located. For instance, the obtained data from the sensor 120 over the distributed sensor network may be transmitted to the application server 160, which then identifies the one or more additional devices based on stored information associated with the sensor 120. For example, the sensor information may include authorized users associated with the sensor 120 and/or devices associated with the authorized users. An example of such users can include property managers, or personnel managers that manage maintenance operations that are regularly performed within the property where the sensor 120 may be located.

FIG. 8 illustrates a diagram of system 800 that includes devices connected over a distributed sensor network. The system 800 generally includes the mobile device 140, the application 160 and devices 810 and 820 that each are associated with sensors that exchange communications with the mobile device 140. In some implementations, the sensors associated with the devices 810 and 820 may correspond to the sensors 120 as described previously with respect to FIG. 1.

In general, the distributed sensor network enables transmission of data that can be used to enhance monitoring operations of the devices 810 and 820. For instance, as described previously with respect to FIGS. 6A-6C, data collected by sensors associated with the devices 810 and 820 can be used to monitor information that require periodic updates. In the examples depicted in FIG. 8, the device 810 may be any type of device that requires maintenance and/or or updates (e.g., a soap dispenser, a toilet paper dispenser, towel rack, etc.), and the device 820 may be a device that must be periodically synchronized in order to provide accurate information (e.g., an alarm clock that displays a current time). The devices 810 and 820 may be attached to and/or configured to transmit information to a sensor that then exchanges communications with the mobile device 140. As described previously with respect to FIG. 1, the sensors may be any type of inexpensive sensor (e.g., a weight-bearing scale, liquid sensor, etc.) that is capable of transmitting measured data to the mobile device 140.

The sensors associated with the devices 810 and 820 may exchange data with the mobile device 140 over the distributed sensor network using a variety of techniques. In some implementations, the mobile device 140 is incapable of accessing and/or processing the data obtained from the sensors in order to prevent the user of the mobile device 140 from manipulating the obtained data. In such implementations, the data collected by the sensors associated with the devices 810 and 820 are encrypted such that the mobile device 140 is incapable of accessing information included within the obtained data. The encrypted data is then transmitted to the application server 160, which performs the data processing in order to determine a monitoring operation to perform.

Alternatively, in some implementations, the mobile device 140 may be capable of accessing the data obtained from the sensors associated with the devices 810 and 820. In such implementations, the data transmitted over the distributed sensor network may be unencrypted and available for access by the mobile application 140. The obtained data from the sensors associated with the devices 810 and 820 may then be processed either entirely by the mobile devices 140, by the application server 160, or a combination of both.

In some implementations, the ability of the mobile device 140 to access and/or obtain data from to the sensors associated with the device 810 and 830 may be limited by the use of tokens as described previously with respect to FIGS. 6A-6C and 7. For instance, the token may be distributed to the mobile device 140 prior to exchanging communications with the sensors associated with the devices 810 and 820. The token may also be distributed with a set of associated data such as identifiers associated the sensors, and/or restrictions specified by the token as described previously. In some instances, the distributed token can also be used to decrypt encrypted data obtained from the sensors over the distributed sensor network.

After obtaining the data over the distributed sensor network, the mobile device and/or the application server 160 may process the obtained data to determine information that relates to the operation of the devices 810 and 820. For example, data obtained from the sensor associated with the device 810 may include information related to a maintenance operation. In this example, sensor data can be used to track information indicating whether a reoccurring action has been performed according to a maintenance schedule (e.g., refilling towels in a hotel room). In another example, data obtained from the sensor associated with the device 820 may include information that requires Internet synchronization (e.g., a time displayed on an alarm clock). In this example, data transmissions over the distributed sensor network can be used to synchronize data associated with the device 820 (which may itself not have Internet connectivity) with the Internet using the network connectivity of the mobile device 140.

The information determined from the processed sensor data is provided for output to a user of the mobile device 140. In some implementations, the mobile device 140 may be given to maintenance personnel that perform service operations on the devices 810 and 820. In such implementations, the mobile device 140 provides a user interface 830 that includes an alert instructing the user to perform a particular action that is indicated by the information within the processed sensor data. In the example depicted, data collected by the sensor associated with the device 810 can be used to determine whether a toilet paper dispenser within a hotel room has been replaced with paper during a service period. The collected data may indicate, for example, the last time the device 810 was accessed by service personnel (e.g., based on the last data exchange between the device 810 and the mobile device over the distributed sensor network). Once the mobile device 140 reaches outside a proximate region of the device 810 (e.g., outside a communication range), the mobile device 140 and/or the application server 160 may determine, based on the data transmission between the device 810 and the mobile device 140, that the toilet dispenser has not been updated. In response, the alert may be presented on the interface 830 to remind the maintenance personnel to go back and add toilet paper in the device 810. In another example, the mobile device 140 may determine that sensor data from a sensor indicates that an amount of soap in a soap dispenser is low and needs to be refilled and, in response, provide a notification that the user should refill the soap dispenser. Accordingly, the user may avoid refilling soap dispensers for which no notifications are provided. Alternatively, in some implementations, for example with the device 820, the interface 830 may instead present a request to initiate a data synchronization between the device 820 and the mobile device 140. In such implementations, the user of the mobile device 140 may then be able to transmit an instruction to initiate the synchronization process.

Figure 9:
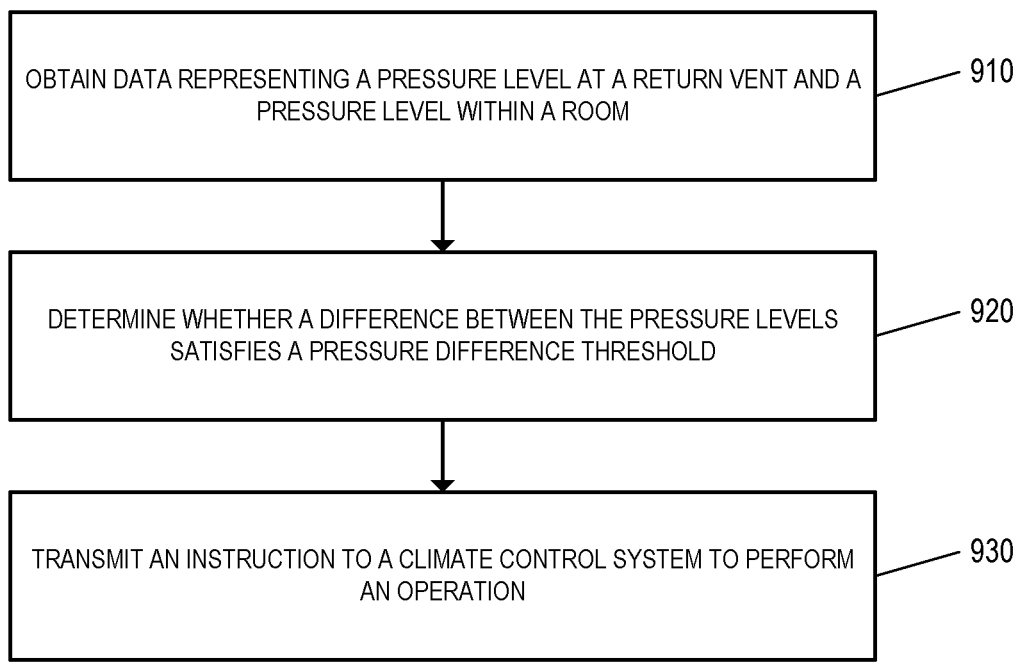
FIG. 9 illustrates an example of a process for adjusting monitoring operations of a climate control system.

FIG. 9 illustrates an example of a process 900 for adjusting monitoring operations of a climate control system. Briefly, the process 900 may include obtaining data representing a pressure level at a return vent and a pressure level within a room (910), determining whether a difference between the pressure levels satisfies a pressure difference threshold (920), and transmitting an instruction to a climate control system to perform an operation (930).

In more detail, the process 900 may include obtaining data representing a pressure level at a return vent and a pressure level within a room (910). For instance, the monitor control unit 110 may obtain data representing a pressure level at a return vent of a climate control system detected by a first air pressure, and a pressure level within a room detected by a second pressure sensor. In some implementations, the first and second air pressures may correspond to the sensors 120, and the climate control system may include one or more of the connected appliances 130 as described previously with respect to FIG. 1

The process 900 may include determining whether a difference between the pressure levels satisfies a pressure difference threshold (920). For instance, as described previously with respect to FIG. 3, the monitor control unit 110 may compare the computed pressure level difference between the respective pressure levels detected by the first and second sensors against a predetermined threshold value. The predetermined threshold value may be determined based on prior performance tests of the climate control system, and/or other sources of information that indicate performance indicators related to the climate control system.

The process 900 may include transmitting an instruction to a climate control system to perform an operation (930). For instance, as described previously with respect to FIG. 3, the monitor control unit 110 may transmit an instruction to the climate control system to perform a particular operation based on determining whether the computed pressure level difference exceeds the predetermined threshold value. For instance, the computed pressure level difference does not exceed the predetermined threshold value, then the monitor control unit 110 may determine that the climate control system is operating normally and transmit an instruction to the climate control system to resume normal operations. Alternatively, if the computed pressure level difference does exceed the predetermined threshold value, the monitor control unit 110 may instead transmit an instruction to perform an adjustment operation by the climate control system.

As described previously with respect to FIG. 3, the particular adjustment operation included within the transmitted within the request may be based on different circumstances associated with the source vent and/or other external conditions associated with the room in which the source vent is located. In one example, the monitor control unit 110 may determine a vent position status associated with the return vent (e.g., open, closed, partially open, etc.) and data obtained from other sensors located within the property (e.g., occupancy sensor data indicating whether a window or door is open). If the vent is closed and the pressure level detected by an air pressure sensor located within a room is greater than the pressure level detected at the return vent, then the adjustment operation may be to partially open a return vent associated with the climate control system. Alternatively, if the vent position status indicates that the vent is already closed, then the adjustment operation may instead be to run a fan associated with the climate control system at a lower pressure.

Figure 10:
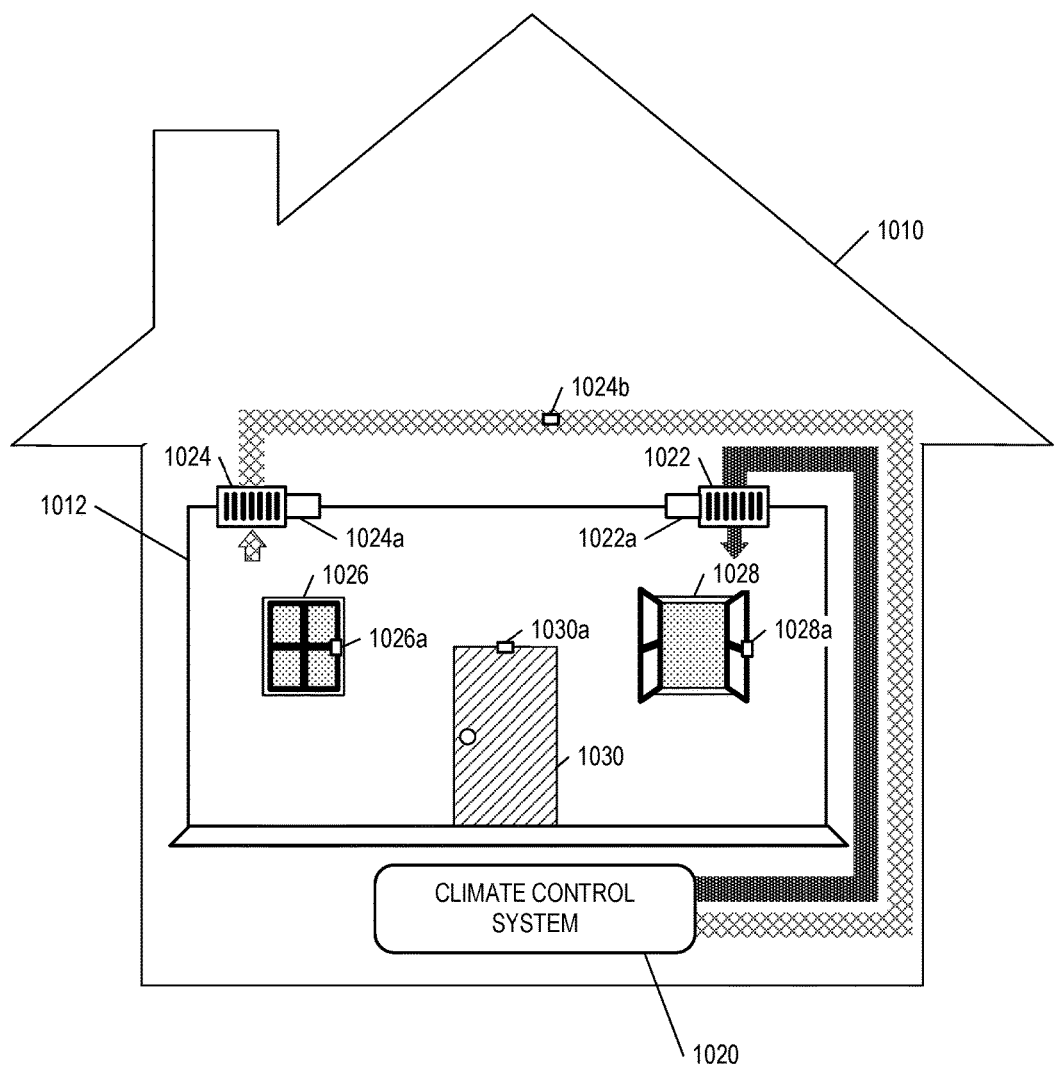
FIG. 10 illustrates an example of a property that includes a climate control system with a set of distributed sensors.

FIG. 10 illustrates an example of a property 1010 that includes a climate control system 1040 with a set of distributed sensors 1022a, 1024a, 1024b, 1026a, 1028a, and 1030a. The climate control system 1020 may include a source vent 1022 that provides air produced by a fan of the climate control system 1020 to a room 1012 of the property, and a return vent 1022 that circulates air within the room 1024 by applying a suction force. The sensors 1022a, 1024a, and 1024b may be air pressure sensors that are each respectively associated with the source vent 1022, the return vent 1024, and the return air ducts of the climate control system 1020. The sensors 1026a, 1028a and 1030a may be positional and/or occupancy sensors that are configured to track the respective movement and/or configuration of windows 1026 and 1028, and the door 1030.

In general, the climate control system 1020 may generally be a system that monitors and/or performs heating, ventilating, and air conditioning (HVAC) operations of the property 1010 in addition to performing additional operations. For instance, in some implementations, the climate control system 1020 include a set of components and/or appliances that perform additional functions to HVAC operations of the property 1010 (e.g., security features, alarm routing, etc.). In some implementations, the climate control system 1020 corresponds to the system 100 described previously with respect to FIG. 1.

As described herein with respect to FIGS. 3 and 9, the sensors 1022a, 1024a, and 1024b may be capable of detecting respective pressure levels associated with the source vent 1022, the return vent 1024, and the 1024b. In some instances, the pressure detected at the sensor 1022a may be used as the pressure detected for the room 1012. Alternatively, in other instances, the room 1012 may instead include a separate air pressure sensor that is centrally located within the room. In such instances, the pressure level detected from this air pressure sensor may instead be determined to be the pressure within the room 1012.

The pressure levels detected at the source vent 1022, the return vent 1024, and the air ducts of the climate control system may be compared (e.g., computing respective pressure level differences, and the computed pressure level differences may then be compared against a predetermined threshold as described previously with respect to FIG. 3. If the computed pressure level difference exceeds the predetermined threshold, then the climate control system 1020 may then perform an adjustment operation as described previously with respect to FIG. 9.

In some implementations, the operation and adjustment of the climate control system 1020 may be modified based on the data collected by the sensors 1026a, 1028a, and the 1030a. For instance, these sensors can be used to determine a present configuration associated with each of the windows 1026, 1028 and the door 1030 in order to determine whether the computed pressure level differences between the source vent 1022, the return vent 1024 and the air ducts may likely be due to the external conditions associated with the room 1012. In the example depicted I FIG. 10, the window 1026 may be determined to be closed based on the data collected by the 1026a, and the door 1030 may also be determined to be closed based on the data collected by the sensor 1030a. However, data collected by the sensor 1028a may be used to determine that the window 1028 remains open and may potentially contribute an computed pressure differences between the pressure level detected at the room 1012 and the pressure level detected at the return vent 1024.

In some implementations, the climate control system 1020 may apply a set of correction factors based on determining that the external conditions of the property may confound the computed pressure level difference between the room 1012 and the return vent 1024. For example, the pressure computed pressure level for the room 1012 may be corrected based on an expected pressure level drop associated with the window 1028 being in an open position. In this example, the system may consider dimensions associated with the window 1028, the time period for which the window 1028 has presently been open, and/or external weather conditions that may also impact the pressure level detected within the room 1012. In this regard, system can use data received from the sensors 1026a, 1028a, and 1030a in order to reduce the likelihood that a detected pressure level difference is falsely attributed to a performance defect associated with the climate control system 1020 and not due to other factors as noted above.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   receiving, by a mobile device and from a server with a first communication protocol, (i) an identification of a sensor located in a property and (ii) a token that enables the mobile device to obtain data collected by the sensor;
   determining, by the mobile device, that the mobile device is within a communication range with the sensor based on the identification received by the mobile device;
   in response to determining that the mobile device is within the communication range with the sensor based on the identification received by the mobile device:
   obtaining, by the mobile device and with a second communication protocol configured for shorter range communication than the first communication protocol, data from the sensor using the token received from the server,
   providing, by the mobile device and to the server with the first communication protocol, the data obtained from the sensor, and
   receiving, by the mobile device and from the server with the first communication protocol, an indication to perform a maintenance operation corresponding to the sensor that was determined by the server based on the data obtained by the sensor; and
   providing, for display on the mobile device, a notification to perform the maintenance operation corresponding to the sensor.

2. The method of claim 1, wherein determining that the mobile device is within the communication range with the sensor comprises:
   transmitting, by the mobile device and to a plurality of sensors within the communication range, a request to receive identification associated with each of the plurality of sensors; and
   identifying the sensor from among the plurality of sensors based at least on comparing identification received from the sensor to the identification received from the server.

3. The method of claim 1, wherein determining that the mobile device is within the communication range with the sensor comprises:
   receiving, by the mobile device and from the sensor, a broadcast signal that identifies the sensor to the mobile device; and
   establishing communications between the sensor and the mobile device based at least on the broadcast signal that identifies the sensor to the mobile device.

4. The method of claim 1, wherein the token that enables the mobile device to obtain data collected by the sensor becomes invalid upon the mobile device obtaining the data collected by the sensor using the token.

5. The method of claim 1, wherein the token that enables the mobile device to obtain data collected by the sensor remains valid for a predetermined time period.

6. The method of claim 1, wherein the token that enables the mobile device to obtain data collected by the sensor specifies a predetermined number of times in which the mobile device can use the token received from the server to obtain data from the sensor over a particular period of time.

7. The method of claim 6, wherein:
the token is generated based at least on a seed value that is associated with both the server and the sensor,
the seed value is used as a seed to pseudo-randomly generate the token, and
the mobile device obtains the data from the sensor without obtaining access to the seed value that is associated with both the server and the sensor.

8. The method of claim 1, wherein the data obtained from the sensor is encrypted based at least on the token received from the server.

9. The method of claim 8, further comprising:
establishing, by the mobile device, communications with the server;
obtaining, by the mobile device, encrypted data from the sensor;
transmitting, by the mobile device, the obtained encrypted data to the server; and
in response to transmitting the obtained encrypted data, receiving, by the mobile device and from the server, a decrypted form of the transmitted data.

10. The method of claim 1, wherein the notification provided for display on the mobile device comprises a user prompt to provide an instruction to the sensor to perform a particular action.

11. The method of claim 1, wherein the notification provided for display on the mobile device comprises a user prompt requesting the user to manually perform a particular action associated with the sensor.

12. A system comprising:
at least one processor; and
at least one computer-readable storage medium coupled to the at least one processor having stored thereon instructions which, when executed by the at least one processor, causes the at least one processor to perform operations comprising:
receiving, by a mobile device and from a server with a first communication protocol, (i) an identification of a sensor located in a property and (ii) a token that enables the mobile device to obtain data collected by the sensor;
determining, by the mobile device, that the mobile device is within a communication range with the sensor based on the identification received by the mobile device;
in response to determining that the mobile device is within the communication range with the sensor based on the identification received by the mobile device:
obtaining, by the mobile device and with a second communication protocol configured for shorter range communication than the first communication protocol, data from the sensor using the token received from the server,
providing, by the mobile device and to the server with the first communication protocol, the data obtained from the sensor, and
receiving, by the mobile device and from the server with the first communication protocol, an indication to perform a maintenance operation corresponding to the sensor that was determined by the server based on the data obtained by the sensor; and
providing, for display on the mobile device, a notification to perform the maintenance operation corresponding to the sensor.

13. The system of claim 12, wherein the operations further comprise:
receiving the data from the sensor in an unencrypted form from the server; and
providing, for display on the mobile device, a notification based on the data from the sensor in the unencrypted form.

14. The system of claim 12, wherein determining that the mobile device is within the communication range with the sensor comprises transmitting, by the mobile device, a request that includes the received identification of the sensor located in a property.

15. The system of claim 12, wherein the obtained data collected by the sensor becomes invalid upon the mobile device obtaining the data from the sensor using the token.

16. The system of claim 12, wherein the obtained data collected by the sensor remains valid for a predetermined time period.

17. A non-transitory computer-readable storage device encoded with computer program instructions that, when executed by one or more computers, cause the one or more computers to perform operations comprising:
receiving, by a mobile device and from a server with a first communication protocol, (i) an identification of a sensor located in a property and (ii) a token that enables the mobile device to obtain data collected by the sensor;
determining, by the mobile device, that the mobile device is within a communication range with the sensor based on the identification received by the mobile device;
in response to determining that the mobile device is within the communication range with the sensor based on the identification received by the mobile device:
obtaining, by the mobile device and with a second communication protocol configured for shorter range communication than the first communication protocol, data from the sensor using the token received from the server,
providing, by the mobile device and to the server with the first communication protocol, the data obtained from the sensor, and
receiving, by the mobile device and from the server with the first communication protocol, an indication to perform a maintenance operation corresponding to the sensor that was determined by the server based on the data obtained by the sensor; and
providing, for display on the mobile device, a notification to perform the maintenance operation corresponding to the sensor.

18. The device of claim 17, wherein:
the sensor collects data identifying a present time indicated by a digital clock located in the property;
the indication received from the server indicates that the present time indicated by the digital clock is incorrect; and
the notification provide for display on the mobile device comprises an instruction to adjust the present time indicated by the digital clock.

19. The device of claim 17, wherein the sensor is incapable of using the first communication protocol for data communication.

* * * * *